United States Patent
Flikkema et al.

(10) Patent No.: US 11,431,692 B2
(45) Date of Patent: Aug. 30, 2022

(54) MULTI-FUNCTIONAL UNITS FOR TERNARY COMPUTING

(71) Applicant: Arizona Board of Regents on Behalf of Northern Arizona University, Flagstaff, AZ (US)

(72) Inventors: Paul Flikkema, Flagstaff, AZ (US); Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 406 days.

(21) Appl. No.: 16/492,562

(22) PCT Filed: Mar. 30, 2018

(86) PCT No.: PCT/US2018/025419
§ 371 (c)(1),
(2) Date: Sep. 9, 2019

(87) PCT Pub. No.: WO2018/183859
PCT Pub. Date: Oct. 4, 2018

(65) Prior Publication Data
US 2020/0045033 A1    Feb. 6, 2020

Related U.S. Application Data
(60) Provisional application No. 62/479,137, filed on Mar. 30, 2017.

(51) Int. Cl.
| | | |
|---|---|---|
| H04L 9/40 | (2022.01) | |
| G06N 10/00 | (2022.01) | |
| G06F 9/30 | (2018.01) | |
| G11C 11/56 | (2006.01) | |

(52) U.S. Cl.
CPC .......... *H04L 63/08* (2013.01); *G06F 9/30145* (2013.01); *G06N 10/00* (2019.01); *G11C 11/56* (2013.01)

(58) Field of Classification Search
None
See application file for complete search history.

(56) References Cited

U.S. PATENT DOCUMENTS

| | | |
|---|---|---|
| 5,524,088 A | 6/1996 | Yoshida |
| 6,108,227 A | 8/2000 | Voelkel |
| 6,279,133 B1 * | 8/2001 | Vafai ............... G06F 11/1072 714/763 |
| 10,218,494 B1 * | 2/2019 | de Quehen ............. G06F 7/00 |
| 2004/0032758 A1 * | 2/2004 | Cheng ................. G11C 15/04 365/49.17 |
| 2007/0088910 A1 | 4/2007 | Parthasarathy et al. |
| 2014/0042442 A1 * | 2/2014 | Bruley ................. G06F 21/73 257/E21.531 |

(Continued)

FOREIGN PATENT DOCUMENTS

WO   2016082081   6/2016

Primary Examiner — Kaveh Abrishamkar
(74) Attorney, Agent, or Firm — Quarles & Brady LLP

(57) ABSTRACT

The present disclosure relates to implementations of computing systems. Specifically, the disclosure describes implementations of computing systems that use ternary states for implementing security systems.

15 Claims, 6 Drawing Sheets

(56) References Cited

U.S. PATENT DOCUMENTS

2017/0046129 A1\* 2/2017 Cambou ................. G06F 7/588
2017/0048072 A1\* 2/2017 Cambou .............. G11C 15/046
2018/0166400 A1\* 6/2018 Wang ................... H04L 9/3278

\* cited by examiner

MULTI-FUNCTIONAL UNITS FOR TERNARY COMPUTING

CROSS REFERENCE TO RELATED APPLICATIONS

This application is a U.S. National Stage of PCT Application No. PCT/US18/25419 filed on Mar. 30, 2018, which claims priority to U.S. Provisional Pat. App. Ser. No. 62/479, 137 entitled "Multi-Functional Units for Ternary Computing" filed on Mar. 30, 2017, the disclosure of which is hereby incorporated entirely herein by reference. Furthermore, this application is related to U.S. application Ser. No. 14/958,436 entitled "Physically Unclonable Function Generating Systems and Related Methods" filed on Dec. 3, 2015, U.S. application Ser. No. 15/347,721 entitled "Encoding Ternary Data for PUF Environments" filed on Nov. 9, 2016, and U.S. application Ser. No. 15/347,715 entitled "PUF-Based Password Generation Scheme" filed on Nov. 9, 2016 all of which applications are incorporated fully herein by reference.

FIELD OF THE INVENTION

The present disclosure relates to implementations of computing systems. Specifically, the disclosure describes implementations of computing systems that use ternary states for implementing security systems.

BRIEF DESCRIPTION OF THE DRAWINGS

The present disclosure is illustrated by way of examples, embodiments, and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

General purpose ternary computers have not typically been successful in the marketplace, because they are not as efficient as the ones computing binary codes. However, native ternary codes executed on native ternary computers can significantly outperform legacy codes, in particular when dedicated to strengthen cybersecurity. This disclosure provides solutions based on the replacement of the monolithic arithmetic logic unit (ALU) of a general purpose computer with a set of functional units (multi-functional units) having at least one unit executing binary instructions, and one unit acting as a reduced instruction set computing (RISC) engine set up to directly execute ternary instructions.

Figure 1:
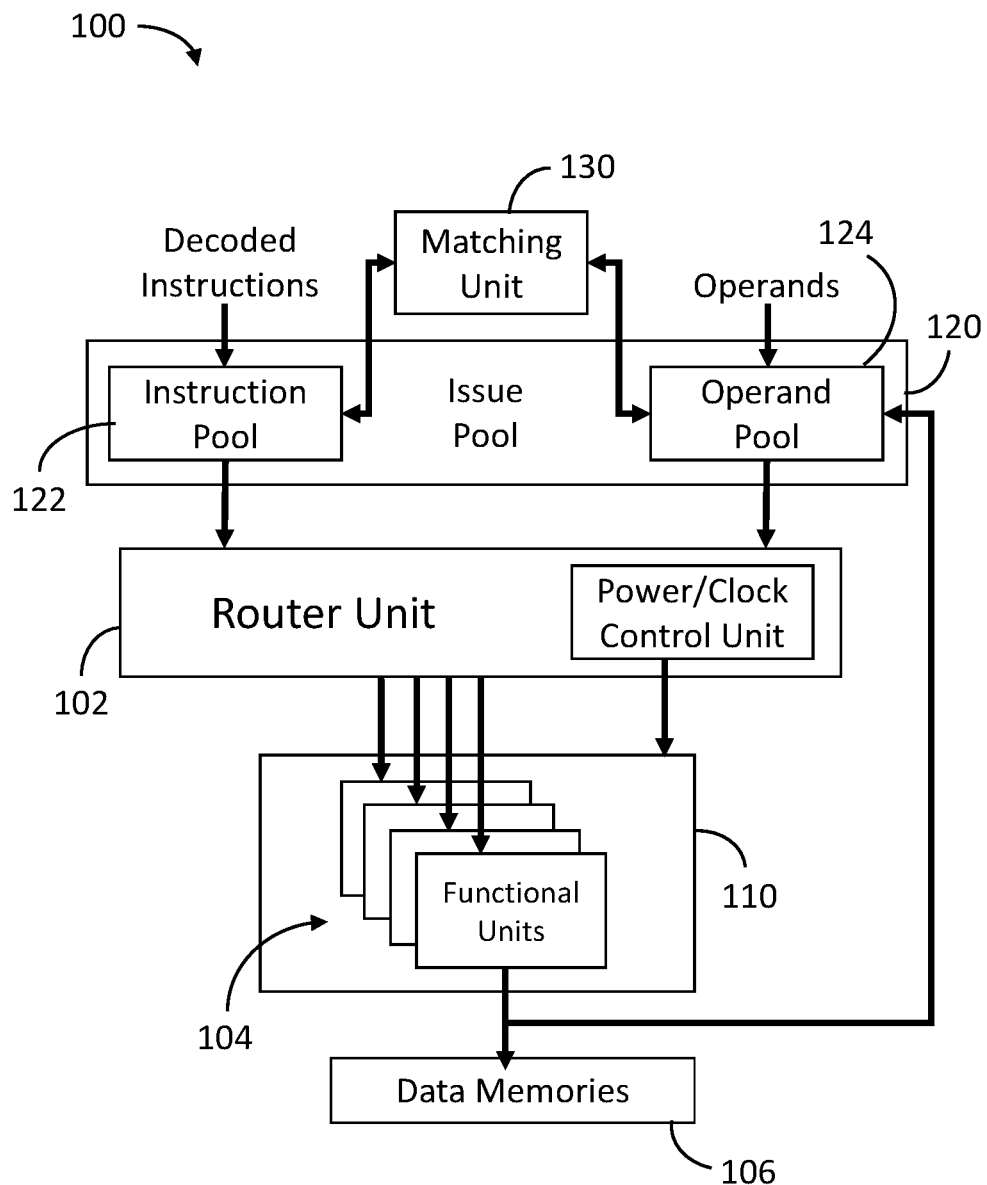
FIG. 1 is a diagram of an example computing architecture depicting a downstream portion of a processor data path.

Referring to FIG. 1, an example computing architecture 100 in accordance with this disclosure can be based on a router unit 102 that dispatches binary and ternary instructions to one or more multi-functional units 104. The multi-functional units 104 can include binary units dedicated to execute legacy codes, and ternary units executing codes such as the ones described in this disclosure that benefit from ternary instructions, in particular for cyber-security. The multi-functional units 104 can produce output data that is sent for storage in memory 106 and/or is sent to an issue pool 120 as described below.

A binary data stream of N bits (i.e., data elements having one of two possible "binary" values) has $2^N$ values, while a ternary data stream of N trits (i.e., data elements having one of three possible "ternary" values) has $3^N$ values. For example if N=12, a binary stream has 4,096 values while a ternary stream has 531,441 values. This can result in much higher computing power and can increase the "entropy" of cryptosystems for the same data stream length. This is a very desirable attribute for cryptography and cryptosystems.

The possible values for data elements in a binary or ternary data stream may correspond to the possible states of a corresponding binary or ternary arithmetic system. A binary arithmetic system is based on two states (0, 1). A balanced ternary arithmetic system is based on the three states (−1, 0, +1), with "−1" replacing the "0" of binary arithmetic, the "+1" replacing the "1" of binary arithmetic, and the new ternary state "0" representing a "fuzzy" state. Additional arithmetic instructions using the ternary state have been suggested, giving an additional degree of freedom to develop algorithms. If a code is written with ternary instructions, a binary computer may require a compiler with ternary-to-binary conversion which is less efficient than a native ternary computer. Therefore, it may be beneficial to have native ternary instructions sets in cryptosystems with native ternary computers.

Binary arithmetic can be considered as a subset of ternary arithmetic by ignoring the fuzzy states so ternary computers can directly execute native binary codes. This is a positive attribute for information assurance because legacy cryptographic codes such as Advanced Encryption Standard (AES), RSA, and elliptic-curve cryptography (ECC) can be executed on ternary computers. However, significant energy efficiency degradation may be likely because the circuitry dedicated to the fuzzy states will then be idle.

The use of a "native" ternary computer with native coding based on ternary algorithms may be expected to be extremely powerful compared with binary computers unless the need to concurrently run legacy binary codes on the same computer is too high. The computing architecture 100 avoids the bottleneck of a monolithic ALU architecture in favor of an ALU 110 with multi-functional units 104, one of these units being a crypto-processor dedicated to security. This architecture 100 is shown in FIG. 1, wherein a ternary data stream can be converted back and forward for binary or ternary logical processing by using (01) for a (−1), (00) for a (0), and (10) for a (+1). For example, a computing device implementing the architecture 100 can maintain an issue pool 120 including an instruction pool 122 that stores decoded versions of the instructions that are available in binary and/or ternary format. The issue pool 120 can further include an operand pool 124 that stores binary and/or ternary operands that can be referenced in the instructions. A matching unit 130 includes program logic that determines whether an instruction is a binary instruction or ternary instruction by matching the instruction's operand to the operands in the operand pool 124. This information can be passed to (or determined by) the router unit 102 in order to appropriately route instructions.

Ternary logic designed with traditional complementary metal-oxide-semiconductor (CMOS) technologies using dual power supply, −1 Volt/+1 Volt, can execute native logic ternary codes with the −1/0/+1 states. Elementary logic gates AND, OR, NOT, and XOR are applicable to ternary logic. These logic gates can have truth tables with 9 cases {(−1, −1); (−1, 0); (−1, 1); (0, −1); (0, 0); (0, 1); (1, −1); (1, 0); (1, 1)}, versus the 4 cases {(0, 0); (0, 1); (1, 0); (1, 1)} normally available in binary logic. Additional logic functions that exist only with ternary logic have also been suggested such as uncertainty to truth ($U_T$), uncertainty to false ($U_F$), truth to not ($T_{NOT}$), or false to not ($F_{NOT}$). The circuitry of these ternary gates can be about twice at complex as the circuitry needed for binary logic.

Ternary content addressable memories (TCAM), widely used in routers to handle IP packets, store three states "0", "1", and "don't care". Technically TCAMs are not native ternary memories because the storage of the ternary states is done by doubling the number of static random-access memory (SRAM) cells. SRAM cells can be directly designed with ternary states for the design of TCAMs and ternary caches. Other memory technologies that can directly store ternary states in their cells include multilevel NAND flash technologies which are based on multiple threshold voltages to store ternary or quaternary bits. This technology is thereby able to store more information per chip, reducing the cost per stored gigabit. The state machines convert the ternary or quaternary information into binary information, making the flash devices function like binary memories. Other memory technologies that can directly store ternary states in their cells include DRAM memories which naturally have a ternary design. In this case, Q electric charges are trapped in a cell to store a "1" state, there is no charge to store a "0" state, and Q/2 charges are stored on the reference cells. As the charges in the memory array cells slowly leak overtime, the sensing element, during "read" mode, compares these remaining charges to the charges left in the reference cells. The design of a ternary DRAM device is based on trapping 0, Q/2, or Q charges on the arrays, as well as Q/4 and 3Q/4 charges in the reference cells. This design has lower design margins which needs to be compensated by a more accurate sensing element.

The concept of ternary memristors and ReRAM may also increase the bit capacity of memory arrays. One such method includes creating three different levels of resistivity during a programming cycle. This can be done by adding more filaments between the electrodes of each cell or by enlarging the cross-section of the filaments. The three states are then defined by three resistances, typically in the 1 KΩ range for the "−1" state, 10 KΩ for the "0", and 10 MΩ for the "+1" state. Native ternary memories may also be used with MRAM. In that case, a giant magneto-resistive (GMR) structure uses a stack of two antiferromagnetic layers and two tunnel oxides sandwiching a ferromagnetic layer and a self-reference design. The native ternary states have thereby three different levels of resistivity. In some cases, carbon nanotube-based ternary memories may also be used.

Figure 2A:
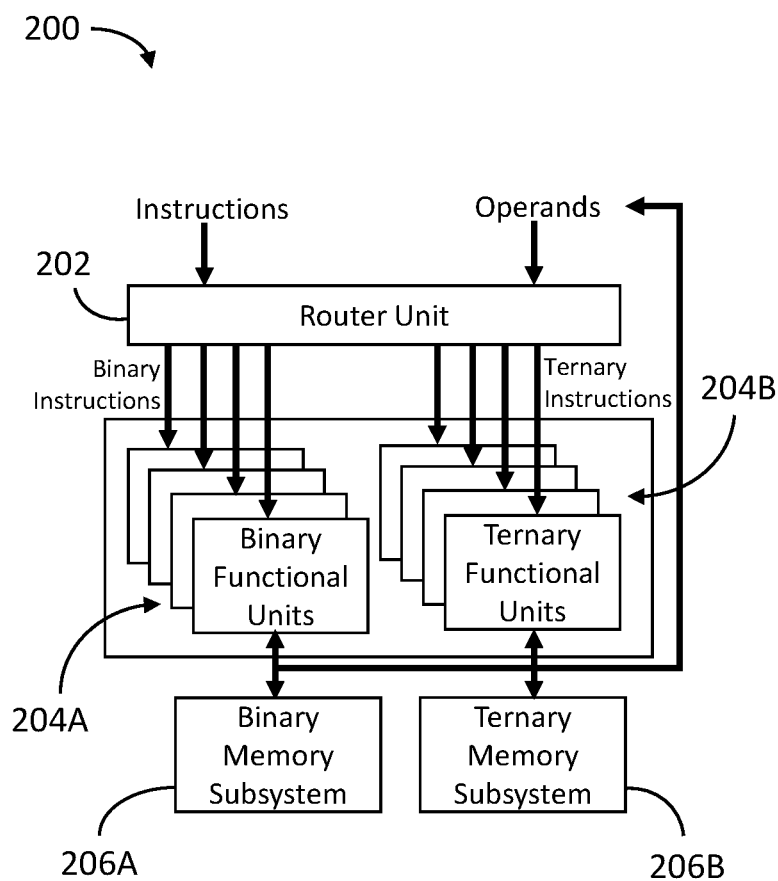
FIG. 2A is a diagram of another example computing architecture depicting separate processor data paths for binary and ternary instructions.

Referring to FIG. 2A, another example ternary computer architecture 200 can be based on a router unit 202 that separates the set of binary instructions, to execute them on binary functional units 204A, from the set of ternary instructions that are executed on separate functional units 204B. The ternary functional units 204B can take advantage of the availability of microelectronic components that can execute ternary instructions directly in a native mode. The computing results produced by the separate binary functional units 204A and ternary functional units 204B can respectively be stored or otherwise make use of correspondingly separated binary and ternary memory subsystems 206A, 206B. In some embodiments, the ternary memory subsystem 206B may include ternary memories so the ternary functional units can directly store information on separate memories which increases the information bandwidth. This architecture 200 does not penalize the efficiency of the binary instruction route, providing some advantages over the architecture 100 for processing binary instructions, but adding to the complexity of the corresponding system circuitry.

Figure 2B:
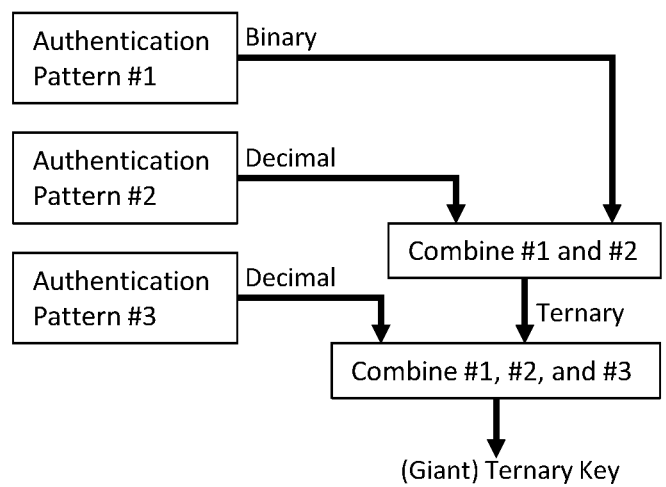
FIG. 2B is a diagram depicting the generation of giant ternary keys from multiple authentication patterns.

In the method presented in FIG. 2B, the system generates a giant ternary key (e.g. using the architecture 200 of FIG. 2A) as a combination of multiple authentication keys such as passwords, pin codes, physically unclonable function (PUF) challenges, or other binary data streams. The longest key is kept as the original binary stream. The following keys are first converted into a decimal data stream and used to insert ternary states inside the original binary stream with an edit distance algorithm. The giant ternary key can be stored in the memory for future authentication. For example, the giant ternary key can be generated, based at least on one or more PUFs embodied in a memory device, as a PUF challenge later used in a challenge response pair to authenticate the memory device. The method reduces the efficiency of sequential attacks because it eliminates partial authentications with a single factor; the entropy of a giant ternary key can be much higher than the entropy of separate binary keys combined.

Figure 3:
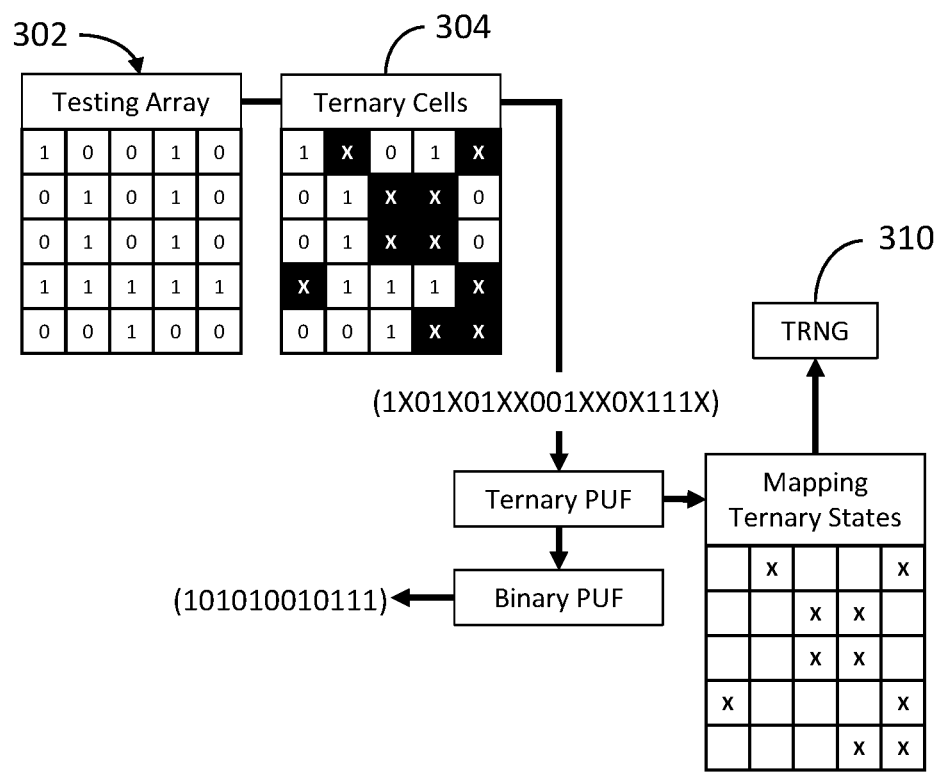
FIG. 3 is a diagram depicting a system and method to generate state mappings for binary and ternary PUFs embodied in memory arrays.

Physically unclonable functions exploit the natural variations introduced during the manufacturing of electronic components which act as the "fingerprint" of the hardware. One of the limitations of the PUFs is the drifts and changes of the fingerprints when subjected to electromagnetic noise, temperature variations, or aging. Referring to FIG. 3, the present system may overcome this limitation by implementing PUFs using ternary states. The cells of a testing array 302 may be fully tested in order to sort out the "marginal" cells, where the assigned state is unstable and could flip (i.e., from zero to one or from one to zero) in response to changes in physical conditions. In an array 304 of ternary cells corresponding to the testing array 302, the marginal cells may be "blanked" by associating them with a ternary state "X". The remaining cells are thereby reliable when tested again during the authentication cycles. The ternary cells can be skipped during the authentication, and can be ignored or used as inputs to a true random number generator (TRNG) 310.

Figure 4:
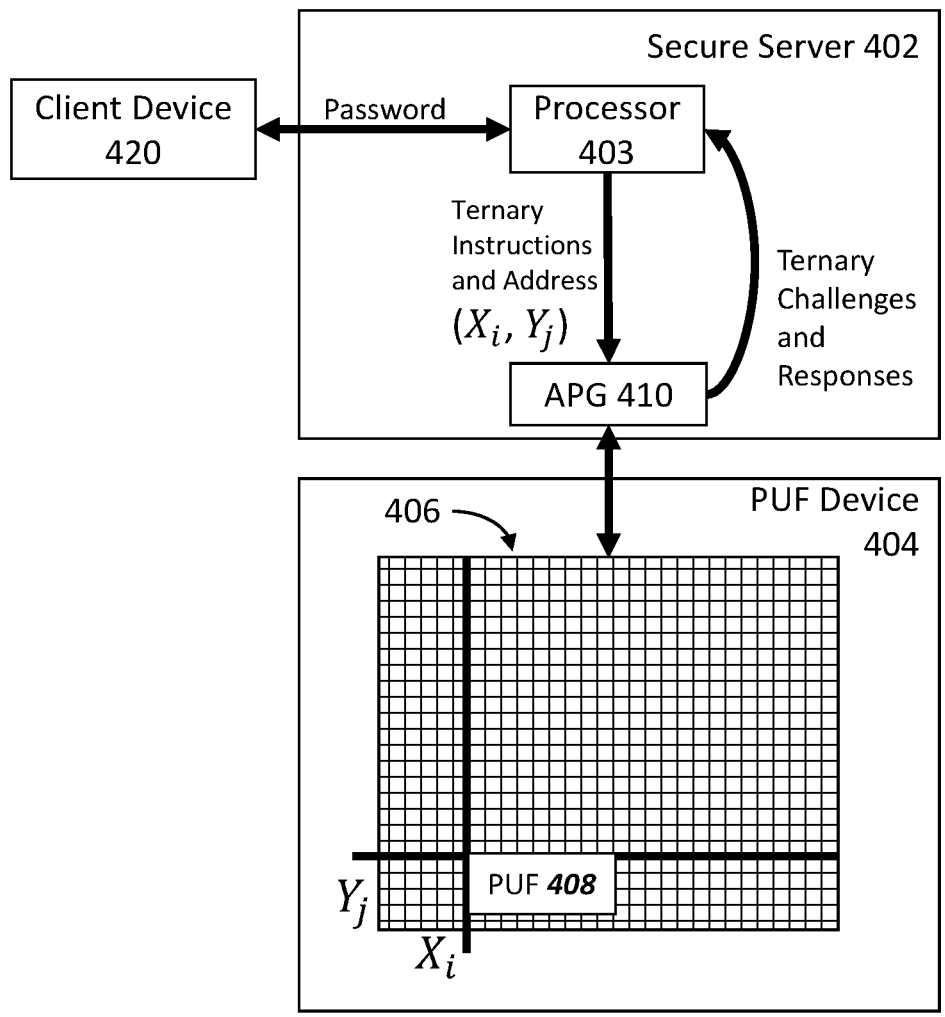
FIG. 4 is a diagram of an addressable PUF generator implementing a password generation and authentication scheme with arrays of ternary PUFs.

Referring to FIG. 4, a system 400 of the invention can include a hardware computing device, such as a secure sever 402, that has a processor 403 configured to process ternary instructions, and a PUF device 404, such as a memory device having an array 406 of cells in which can be implemented one or more ternary PUFs 408, as described above. A ternary PUF 408 can be used to design password generators, referred to as addressable PUF generators (APGs) 410; the generated passwords are specific to the PUF device 404, so that an authorized user of a client device 420 who also has physical possession of the PUF device 404 can gain access to the secure sever 402. During password generation, the APG 410 uses a PUF 408 located at a particular address (i.e., a starting cell having coordinates ($X_i$, $Y_j$)) within the array 406 to generate a ternary "challenge" (i.e., string of data elements comprising a reference pattern of the PUF 408) with a particular set of ternary instructions. The resulting password can be a ternary data stream (i.e., of "trit" data elements) combining the address, the instruction, and the challenge. During authentication, the password is analyzed, and the knowledge of the address is used to find the same PUF 408 with the ternary instruction. A ternary "response" (i.e., fresh pattern) is generated and compared to the reference challenge. The authentication is positive if the challenge matches the response. This password generation method is more secure than a lookup table when combined with random numbers, hash functions, and dynamically generated passwords.

Figure 5:
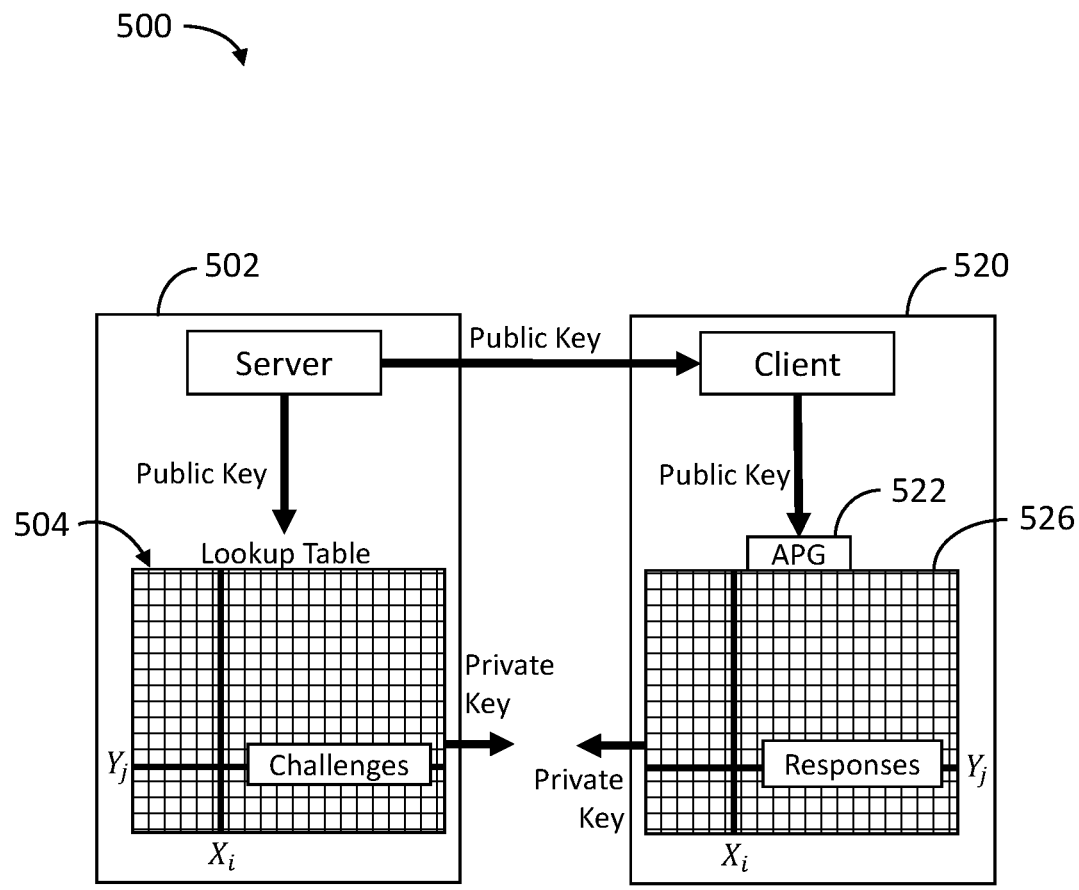
FIG. 5 is a diagram of a public key infrastructure (PKI) scheme in accordance with the present disclosure.

Referring to FIG. 5, arrays of ternary PUFs can also be used to design a public key infrastructure (PKI) architecture 500 using a scheme similar to the one described above. For example, each client computing device 520 can have its own APG 522, and lookup tables 504 or other stored data structures, storing all possible addresses of ternary PUFs within the array 526 of memory cells as well as their corresponding ternary challenges, can be downloaded from the secure server 502. The public key for each client device 520 is the ternary data stream that includes a particular binary address within the array 526, plus unique ternary instructions to generate a private key from the corresponding ternary challenges. Using the same public key, the client device 520 can find the address, extract the corresponding PUF responses using the APG 522, and independently generate the same private key. The secure server 502 and client device 520 can thereby communicate through symmetrical encryption schemes, such as AES, using the private key as the encryption key. A malicious party cannot generate the private key from the public key without stealing the lookup table 504. This PKI scheme can be strengthened when combined with random numbers, hash functions, and dynamically generated public keys.

In embodiments, an ALU or other processing unit is designed with at least two separate functional units. The first unit is dedicated to the execution of binary codes with binary instructions. The second unit is dedicated to the execution of ternary codes with ternary instructions. The ALU may be driven by a router which directs the binary instructions to the first unit and directs the ternary instructions to the second unit. The first unit may be connected with a memory unit or subsystem for storing and reading binary information (bits), and the second unit may be connected with a memory unit or subsystem for storing and reading ternary information (trits). The first unit may be designed with native binary logic gates, and the second unit may be designed with native ternary logic gates.

In some embodiments, the circuitry used to design the second unit may include complementary metal-oxide-semiconductor (CMOS)-based materials with additional threshold voltage. Some embodiments may use positive and negative voltage to power the circuits; some embodiments may be based on quantum computing circuitry such as optical electronics, spin based electronic, and the Josephson effect. The ternary logic can be balanced with the states (−, 0, +), or unbalanced with the states (0, 1, 2). The memory unit for storing and reading ternary information may be a multilevel flash memory, a dynamic random-access memory (DRAM) with additional charge stored to create the ternary state, a magnetic RAM with additional states, or a memristor, a resistive RAM (ReRAM), or a conductive-bridging RAM (CBRAM) with multiple levels of resistivity. The second unit may be dedicated to executing cryptographic instructions; in such embodiments, multifactor authentication keys combining several factors are employed to create giant ternary keys wherein the ternary states can be used to offer an additional level of flexibility to store multiple factors in one key to increase entropy. In related embodiments, physical unclonable functions with ternary states are used wherein the ternary states may describe the cells of the physically unclonable functions that are marginal and potentially subject to variations over the life of the device; in other embodiments, random number generators are used to exploit the ternary states of the physical unclonable functions. Some embodiments used password generators based on arrays of the physically unclonable functions with ternary states. Some embodiments employ public key infrastructure architectures based on arrays of the physically unclonable functions with ternary states in which the public keys are related to the addresses within the arrays, and the private keys are related to the challenge response pairs of the physically unclonable functions. In additional embodiments, public key infrastructure architectures based on the exchange of ternary data bases in which the public keys are related to an address in these tables, and the private keys are related to the content of these tables.

In one aspect, this disclosure provides a system including one or more hardware computing devices configured to perform multifactor cryptographic authentication. The hardware computing devices each include: a processor configured to select specific computer-executable instructions for execution by the one or more hardware computing devices, the instructions including binary instructions encoded using binary codes and ternary instructions encoded using ternary codes; a first functional unit configured to execute the binary instructions; a second functional unit separate from the first functional unit and configured to execute the ternary instructions; and, a router in signal communication with the processor and with the first functional unit and the second functional unit. The router is configured to: receive a first instruction of the instructions selected by the processor; determine whether the first instruction is one of the binary instructions or one of the ternary instructions; responsive to a determination that the first instruction is one of the binary instructions, route the first instruction to the first functional unit; and, responsive to a determination that the first instruction is one of the ternary instructions, route the first instruction to the second functional unit.

Each of the one or more hardware computing devices may further include a first memory unit in signal communication with the first functional unit and configured to store binary information, and a second memory unit in signal communication with the second functional unit and configured to store ternary information. The second memory unit may include at least one of a multilevel flash memory configured to store ternary data values, a DRAM with additional charge stores configured to store ternary data values, a magnetic RAM with ternary storage states configured to store ternary data values, and a Memristor, ReRAM, or CBRAM with multiple levels of resistivity configured to store ternary data values. The first functional unit may include a plurality of native binary logic gates and the second functional unit may include a plurality of native ternary logic gates. The second functional unit may be CMOS-based with additional threshold voltages, may use positive and negative voltage to power circuits of the second functional unit, and/or may be based on quantum computing circuitry. The second functional unit may include a plurality of native ternary logic gates using balanced ternary logic having states (−, 0, +).

The second functional unit may be dedicated to executing cryptographic instructions that, when executed, cause a corresponding hardware computing device of the one or more hardware computing devices to obtain values for a plurality of factors associated with the authentication, and combine the values to produce a giant ternary key comprising data elements each associated with one of three ternary states. The plurality of factors may include a first authentication pattern, a second authentication pattern, and a third authentication pattern; the second functional unit may be configured to obtain, as the values of the plurality of factors, a first binary data stream representing the first authentication pattern, a first decimal data stream representing the second authentication pattern, and a second decimal data stream representing the third authentication pattern. To combine the values to produce the giant ternary key, the second function unit may use the first decimal data stream to insert a first plurality of data elements associated with the ternary states into the first binary data stream to produce a first ternary data stream, and use the second decimal data stream to insert a second plurality of data elements associated with the ternary states into the first ternary data stream to produce a second ternary data stream comprising the giant ternary key.

The system may further include a memory device including an array of memory cells, a physically unclonable function (PUF) being embodied in the array; a first factor of the plurality of factors may be a reference pattern generated from the PUF. The PUF may be a ternary PUF, and the one or more hardware computing devices may each further include a password generator in signal communication with the processor and configured to: receive an address from the processor; identify, within the array and based on the address, a first plurality of memory cells that comprise the PUF; determine a corresponding state of the ternary states for each of the first plurality of memory cells; and produce, as the value of the reference pattern, a data stream comprising data elements each associated with the state of a corresponding memory cell in the first plurality of memory cells. The ternary states may be (0, X, 1); the ternary state (0) is associated with a binary state (0), the ternary state (1) is associated with a binary state (1), and the ternary state (X) is associated with each of the first plurality of memory cells in which the determined corresponding state is potentially subject to variations over a life of the memory device. To produce the data stream, the password generator may be configured to: produce a ternary data stream comprising a plurality of ternary data elements each associated with a corresponding memory cells of the first plurality of memory cells and storing the state of the corresponding memory cell, and extract from the ternary data stream each of the ternary data elements having the ternary state (X) to produce, as the data stream, a binary data stream.

The reference pattern may be a PUF challenge; a second factor of the plurality of factors may be a first ternary instruction, and a third factor of the plurality of factors may be an address where the PUF is located in the array. The second ternary data stream may represent a password combining the reference pattern, the first ternary instruction, and the address. The system may further include a client computing device in electronic communication with the one or more hardware computing devices and configured to: establish signal communication with the memory device; receive the password from the one or more hardware computing devices; determine the address, the first ternary instruction, and the PUF challenge from the password; use the address to identify the first plurality of memory cells; determine a corresponding present state, of the ternary states, for each of the first plurality of memory cells; produce, as a PUF response, an authentication data stream comprising data elements each associated with the present state of a corresponding memory cell in the first plurality of memory cells; and, send the PUF response to the one or more hardware computing devices. The one or more computing devices may be further configured to: receive the PUF response; determine whether the PUF response matches the PUF challenge; and, responsive to a determination that the PUF response matches the PUF challenge, authenticate the client computing device.

The memory device may use three levels of resistivity to directly store any one of the ternary states in each of the memory cells of the array, based on the memory cell's corresponding level of resistivity. The memory device may directly stores any one of the ternary states in each of the memory cells of the array, based on the memory cell's corresponding electric charge.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system, comprising one or more hardware computing devices configured to perform multifactor cryptographic authentication, the one or more hardware computing devices each comprising:
   a processor configured to select specific computer-executable instructions for execution by the one or more hardware computing devices, the instructions including binary instructions encoded using binary codes and ternary instructions encoded using ternary codes;
   a first functional unit configured to execute the binary instructions;
   a second functional unit separate from the first functional unit and configured to execute the ternary instructions; and
   a router in signal communication with the processor and with the first functional unit and the second functional unit, the router configured to:
   receive a first instruction of the instructions selected by the processor;
   determine whether the first instruction is one of the binary instructions or one of the ternary instructions;
   responsive to a determination that the first instruction is one of the binary instructions, route the first instruction to the first functional unit along a first data path; and
   responsive to a determination that the first instruction is one of the ternary instructions, route the first instruction to the second functional unit along a second data path that is separate from the first data path.

2. The system of claim 1, wherein each of the one or more hardware computing devices further comprises:

a first memory unit in signal communication with the first functional unit and configured to store binary information; and a second memory unit in signal communication with the second functional unit and configured to store ternary information.

3. The system of claim 2, wherein the second memory unit includes at least one of a multilevel flash memory configured to store ternary data values, a DRAM with additional charge stores configured to store ternary data values, a magnetic RAM with ternary storage states configured to store ternary data values, and a Memristor, ReRAM, or CBRAM with multiple levels of resistivity configured to store ternary data values.

4. The system of claim 1, wherein the first functional unit includes a plurality of native binary logic gates and the second functional unit includes a plurality of native ternary logic gates.

5. The system of claim 1, wherein the second functional unit is CMOS based with additional threshold voltages, uses positive and negative voltage to power circuits of the second functional unit, or is based on quantum computing circuitry.

6. The system of claim 5, wherein the second functional unit includes a plurality of native ternary logic gates using balanced ternary logic having states (−, 0, +).

7. The system of claim 1, wherein the second functional unit is dedicated to executing cryptographic instructions that, when executed, cause a corresponding hardware computing device of the one or more hardware computing devices to:
obtain values for a plurality of factors associated with the authentication; and
combine the values to produce a giant ternary key comprising data elements each associated with one of three ternary states.

8. A system, comprising one or more hardware computing devices configured to perform multifactor cryptographic authentication, the one or more hardware computing devices each comprising:
a processor configured to select specific computer-executable instructions for execution by the one or more hardware computing devices, the instructions including binary instructions encoded using binary codes and ternary instructions encoded using ternary codes;
a first functional unit configured to execute the binary instructions;
a second functional unit separate from the first functional unit and configured to execute the ternary instructions; and
a router in signal communication with the processor and with the first functional unit and the second functional unit, the router configured to:
receive a first instruction of the instructions selected by the processor;
determine whether the first instruction is one of the binary instructions or one of the ternary instructions;
responsive to a determination that the first instruction is one of the binary instructions, route the first instruction to the first functional unit; and
responsive to a determination that the first instruction is one of the ternary instructions, route the first instruction to the second functional unit,
wherein the second functional unit is dedicated to executing cryptographic instructions that, when executed, cause a corresponding hardware computing device of the one or more hardware computing devices to:
obtain values for a plurality of factors associated with the authentication; and
combine the values to produce a giant ternary key comprising data elements each associated with one of three ternary states, and
wherein the plurality of factors includes a first authentication pattern, a second authentication pattern, and a third authentication pattern, and the second functional unit is configured to:
obtain, as the values of the plurality of factors, a first binary data stream representing the first authentication pattern, a first decimal data stream representing the second authentication pattern, and a second decimal data stream representing the third authentication pattern; and
to combine the values to produce the giant ternary key:
use the first decimal data stream to insert a first plurality of data elements associated with the ternary states into the first binary data stream to produce a first ternary data stream; and
use the second decimal data stream to insert a second plurality of data elements associated with the ternary states into the first ternary data stream to produce a second ternary data stream comprising the giant ternary key.

9. A system, comprising one or more hardware computing devices configured to perform multifactor cryptographic authentication, the one or more hardware computing devices each comprising:
a processor configured to select specific computer-executable instructions for execution by the one or more hardware computing devices, the instructions including binary instructions encoded using binary codes and ternary instructions encoded using ternary codes;
a first functional unit configured to execute the binary instructions;
a second functional unit separate from the first functional unit and configured to execute the ternary instructions; and
a router in signal communication with the processor and with the first functional unit and the second functional unit, the router configured to:
receive a first instruction of the instructions selected by the processor;
determine whether the first instruction is one of the binary instructions or one of the ternary instructions;
responsive to a determination that the first instruction is one of the binary instructions, route the first instruction to the first functional unit; and
responsive to a determination that the first instruction is one of the ternary instructions, route the first instruction to the second functional unit,
wherein the second functional unit is dedicated to executing cryptographic instructions that, when executed, cause a corresponding hardware computing device of the one or more hardware computing devices to:
obtain values for a plurality of factors associated with the authentication; and
combine the values to produce a giant ternary key comprising data elements each associated with one of three ternary states, and
further comprising a memory device comprising an array of memory cells, a physically unclonable function (PUF) being embodied in the array, wherein a first factor of the plurality of factors is a reference pattern generated from the PUF.

10. The system of claim 9, wherein the PUF is a ternary PUF and the one or more hardware computing devices each further comprise a password generator in signal communication with the processor and configured to:
   receive an address from the processor;
   identify, within the array and based on the address, a first plurality of memory cells that comprise the PUF;
   determine a corresponding state of the ternary states for each of the first plurality of memory cells; and
   produce, as the value of the reference pattern, a data stream comprising data elements each associated with the state of a corresponding memory cell in the first plurality of memory cells.

11. The system of claim 10, wherein the ternary states are (0, X, 1), the ternary state (0) is associated with a binary state (0), the ternary state (1) is associated with a binary state (1), and the ternary state (X) is associated with each of the first plurality of memory cells where the determined corresponding state is potentially subject to variations over a life of the memory device.

12. The system of claim 11, wherein to produce the data stream, the password generator is configured to:
   produce a ternary data stream comprising a plurality of ternary data elements each associated with a corresponding memory cells of the first plurality of memory cells and storing the state of the corresponding memory cell; and
   extract from the ternary data stream each of the ternary data elements having the ternary state (X) to produce, as the data stream, a binary data stream.

13. The system of claim 10, wherein:
   the reference pattern is a PUF challenge;
   a second factor of the plurality of factors is a first ternary instruction, and a third factor of the plurality of factors is an address where the PUF is located in the array;
   the second ternary data stream represents a password combining the reference pattern, the first ternary instruction, and the address;
   the system further comprises a client computing device in electronic communication with the one or more hardware computing devices and configured to:
   establish signal communication with the memory device;
   receive the password from the one or more hardware computing devices;
   determine the address, the first ternary instruction, and the PUF challenge from the password;
   use the address to identify the first plurality of memory cells;
   determine a corresponding present state, of the ternary states, for each of the first plurality of memory cells;
   produce, as a PUF response, an authentication data stream comprising data elements each associated with the present state of a corresponding memory cell in the first plurality of memory cells; and
   send the PUF response to the one or more hardware computing devices; and
   the one or more computing devices are further configured to;
   receive the PUF response;
   determine whether the PUF response matches the PUF challenge; and
   responsive to a determination that the PUF response matches the PUF challenge, authenticate the client computing device.

14. The system of claim 9, wherein the memory device uses three levels of resistivity to directly store any one of the ternary states in each of the memory cells of the array, based on the memory cell's corresponding level of resistivity.

15. The system of claim 9, wherein the memory device directly stores any one of the ternary states in each of the memory cells of the array, based on the memory cell's corresponding electric charge.

* * * * *